United States Patent [19]
Reese

[11] Patent Number: 4,969,183
[45] Date of Patent: Nov. 6, 1990

[54] TELEPHONE LOTTO NUMBER SYSTEM AND SERVICE

[76] Inventor: Morris Reese, P.O. Box 6651, Thousand Oaks, Calif. 91360

[21] Appl. No.: 399,242

[22] Filed: Aug. 28, 1989

[51] Int. Cl.⁵ .................. H04M 1/56; H04M 1/57
[52] U.S. Cl. .................................. 379/88; 379/89; 379/90; 379/92; 273/85 G; 273/138 R; 273/138 A; 273/139
[58] Field of Search .............. 273/138 A, 85 G, 1 E, 273/269, 139, 138 R, 238, 237; 364/412; 402/23; 379/88, 89, 90, 91, 106, 112, 92

[56] References Cited

U.S. PATENT DOCUMENTS

| | | | |
|---|---|---|---|
| 4,108,361 | 9/1978 | Krause | 364/412 |
| 4,494,197 | 1/1965 | Troy et al. | 273/274 |
| 4,669,730 | 6/1987 | Small | 902/23 |
| 4,815,741 | 3/1989 | Small | 273/1 E |
| 4,845,739 | 7/1989 | Katz | 379/92 |

FOREIGN PATENT DOCUMENTS 1162336  2/1984  Canada ............................ 379/93

OTHER PUBLICATIONS

"Multi-Quest" Service, AT&T, 900 Service Description.
"Turnkey" 900 Service Bureaus, Bruce Kushnick, In Bound/Outbound, Aug. 1989, p. 46.
California Lottery, "How to Play for Millions with Lotto", 1988.
Daily News, "New Lotto Terminals Introduced", Jul. 26, 1989.
Daily News, "Increase in Number Pool Approved, Making Lotto Jackpot Harder to Win", Aug. 17, 1989.

Primary Examiner—Edward M. Coven
Assistant Examiner—Dean Small

[57] ABSTRACT

A process for a telephone lotto number system and service is disclosed which allows a lotto player to use a touchtone phone, which is connected directly or indirectly via a RJ11 jack and telephone lines to telephone company central office equipment, to dial a conventional and dedicated inward calling phone number, e.g. "213-XXX-XXXX", to access and interact with a lotto computer, which is connected via a modem and telephone lines to telephone company central office equipment, to purchase and automatic or manual select a lotto selection ("6" lotto numbers) from a plurality of lotto numbers which are stored in the lotto computer's memory, and charge the dollar amount for the purchase of the lotto selection to a credit card. If the touchtone phone is used to dial an enhanced service phone number, i.e. a dedicated 900 inward calling phone number, to access and interact with the lotto computer to purchase and automatic or manual select the lotto selection, the telephone company to which the lotto player's touchtone phone is connected is permitted to bill and collect from the lotto player, via the lotto player's office or residence monthly telephone statement, a fixed dollar amount for the purchase of the lotto selection and a fixed telephone company line fee for use of the 900 phone number.

1 Claim, 3 Drawing Sheets

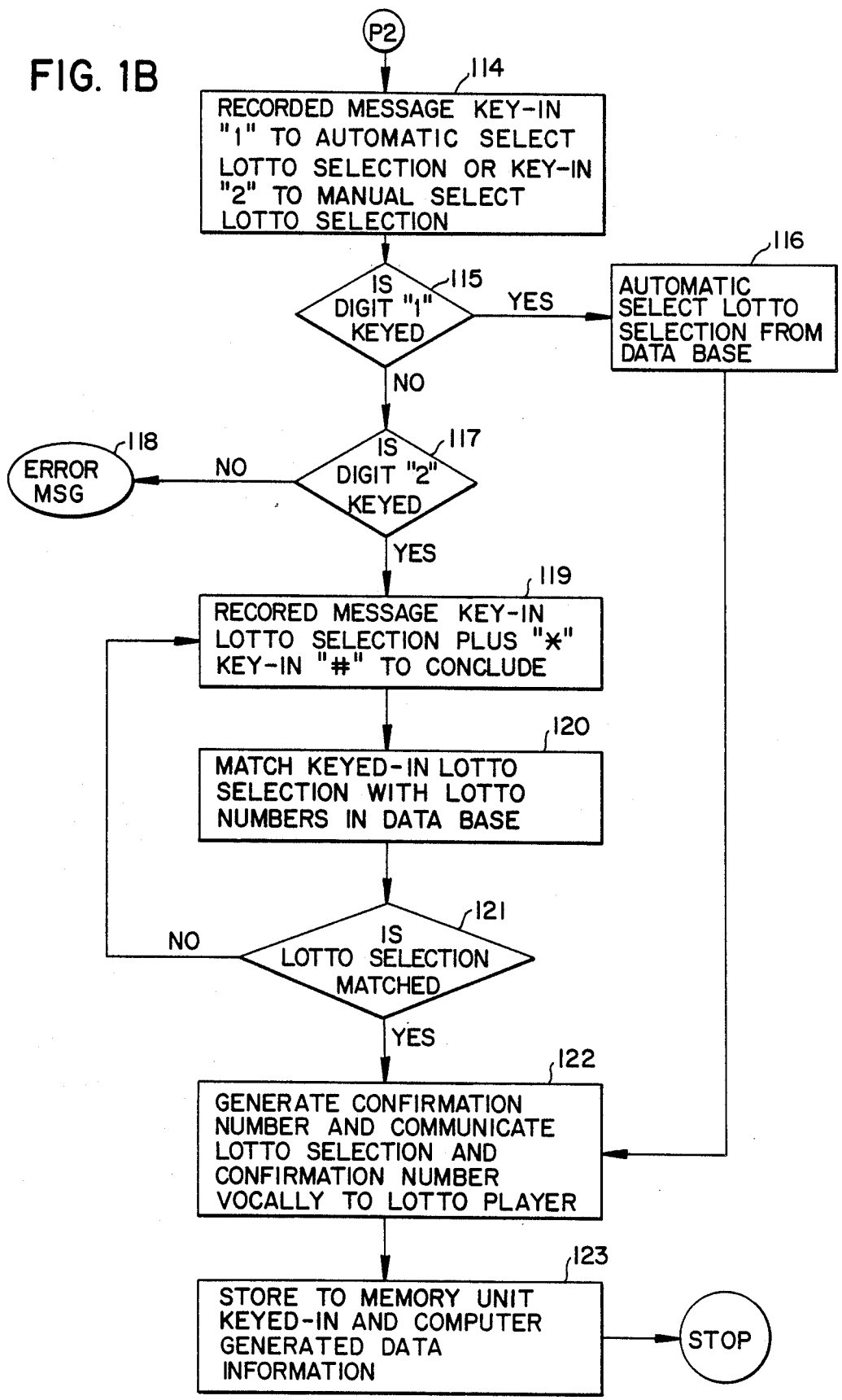

TELEPHONE LOTTO NUMBER SYSTEM AND SERVICE

BACKGROUND OF THE INVENTION

1. Field of the Invention

This invention relates to a telephone lotto number system and service which allows a lotto player to use a dual tone multifrequency (DTMF) touchtone phone to dial a dedicated inward calling phone number to access and interact with a lotto computer to purchase and automatic or manual select a predetermined number of lotto numbers (herein after sometimes referred to as "lotto selection") from a plurality of lotto numbers stored in the lotto computer's memory to play a lotto game.

2. Description of the Prior Art

Presently, players of the lotto game are required to go to one of the participating retail merchants in order to purchase their lotto tickets. This practice eliminates the handicapped, invalid and busy workers who lack the opportunity of walk-in purchase. It also restricts the regular lotto players who sometime find that they cannot go to an authorized retailer to purchase their lotto tickets.

To play the lotto game, present lotto systems allow the lotto player, for cash only, to manual select a predetermined number of lotto numbers from a plurality of lotto numbers, e.g. "6" numbers out of "53" numbers, by placing a vertical mark in each chosen number spot on a lotto playslip that is provided by the lotto retailer.

Another lotto system allows the lotto player to mark the "quick pick" spot on the lotto playslip or by verbally requesting a "quick pick," and the retailer's lotto coputer or lotto terminal will pick lotto selections for the lotto player.

While each of the foregoing illustrations implements a useful way to purchase a lotto ticket and to play the lotto game, regular lotto players and potential lotto players continue to express some degree of dissatisfaction with existing lotto systems, particularly the cash only policy, the limitations of having to travel to the lotto retailer's place of business to purchase a lotto ticket, and waiting in long lines to play the lotto game.

Thus, it is an object of this invention to provide the lotto player with an enhanced service which allows the lotto player who has access to a touchtone phone to dial from an office, home, payphone, automobile, plane, boat or any location a dedicated inward calling number, including a 900 calling number, to access and interact with a lotto computer to purchase lotto selections and to play the lotto game.

More particularly, it is an object of this invention to provide the lotto player with an enhanced service which services regular lotto players, but will also service a large percentage of the population heretofore excluded, i.e. the handicapped and the invalid.

It is yet another object of this invention to provide the lotto player with an enhanced service which allows the lotto player to bill or charge lotto selections purchases to a credit card number or a telephone calling card number or, if the lotto player dials the 900 number, permits the telephone company to bill and collect a predetermined purchase amount for the number of lotto selections selected and a calling fee.

It is still another object of this invention to provide the lotto player with a dedicated inward calling number for use, including a 900 calling number, to access and interact with a lotto computer to play a lotto game.

It is still yet another object of this invention to provide the lotto player with an enhanced service which permits intrreraction between the lotto player, via a touchtone phone, and a lotto computer to play a lotto game.

It is a further object of this invention to provide the lotto player with an enhanced service which allows the lotto player from one state to participate in a lotto game in another state.

It is still a further object of this invention to provide the lotto player with an enhanced service which does not require travelling to a lotto retailer's place of business to purchase lotto selections or to play a lotto game.

It is still yet a further object of this invention to provide State Lottery Commissions and Agencies with a revenue producing enhanced service and systems which interacts with existing telephone switching systems, credit card and telephone calling card verification and credit processing systems, and 900 service carriers without the added cost of new hardware.

SUMMARY OF THE INVENTION

In accordance with the teaching of this invention, I provide the lotto player with an enhanced service and system which interacts with existing credit card and telephone calling card verification and processing systems, telephone systems, and 900 calling services which allows a lotto player who has access to a DTMF touchtone phone to dial from an office, home, automobile, payphone or any location, a dedicated inward calling number, including a 900 calling number, to access and interact with a lotto computer to purchase and manual or automatic select lotto selections, provided by the entry of predetermined entries keyed-in on the touchtone phone by the lotto player.

A first operation of this invention is when the lotto player dials the dedicated inward calling number which accesses the lotto computer. If the line of the inward calling number is busy, conventional telephone switching system connects to the line and sends busy audible tone signals. If the line is not busy, facilities enables a recorded message which instructs the lotto player to key-in on the touchtone phone a predetermined digit to indicate the use of a credit card, or 900 calling service. Facilities responds to the keyed digit, except for the digit representing a 900 call, by enabling the recorded message which instructs the lotto player to key-in on the touchtone phone the credit card number or telephone calling card number plus the "#" code key, in addition to the purchase or dollar amount to be charged plus the "#" code key. Facilities responds to the keyed information by autodialing the telephone number of the credit card authorization and processing facilities for credit approval. If credit is not approved, facilities enables the recorded message which notifies the lotto player that credit is not approved. However, if credit is approved, facilities enables the recorded message which instructs the lotto player to key-in on the touchtone phone, a predetermined digit to indicate a desired manual or automatic transaction to select lotto selections. If the digit representing the manual transaction is keyed, facilities enables the recorded message which instructs the lotto player to manual key-in on the touchtone phone desired lotto selections plus the "*" code key for each set of lotto selections keyed plus the "#" code key to conclude the manual lotto selections transaction. If the digit representing the automatic transaction is keyed, facilities will automatic select lotto selections. When either the manual or automatic transaction for selecting lotto selections is concluded, facilities communicates the manual or automatic selected lotto selections, including a confirmation number, audibly to the lotto player.

Memory facilities stores to memory the lotto player's credit card number, purchase or dollar amount charged, type of transaction, lotto selections and confirmation number.

A second operation of this invention is when the lotto player dials the inward 900 calling number to access and interact with the lotto computer. Assuming that the line of the calling number is not busy, facilities enables a recorded message which instructs the lotto player to select the type of lotto transaction desire, e.g. automatic or manual lotto selections. The remaining processing of this operation is the same as previously described above for the first operation. A charge for dialing the 900 calling number in addition to the telephone company's line fee is automatically billed to the lotto player's phone bill, plus the purchase or dollar amount for selected lotto selections. The telephone company (900 service carrier) collects all charges, deducts their fees, and sends the net proceeds to the service provider (lottery commission or agency).

BRIEF DESCRIPTION OF THE DRAWING

The foregoing objectives of my invention will become more apparent from the following description when read together with the drawing, in which:

FIG. 1a and FIG. 1b is a flow chart of the principal steps employed in praticing the TELEPHONE LOTTO NUMBER SYSTEM AND SERVICE according to the present invention.

DESCRIPTION OF THE PREFERRED EMBODIMENT (S)

Figure 1A:
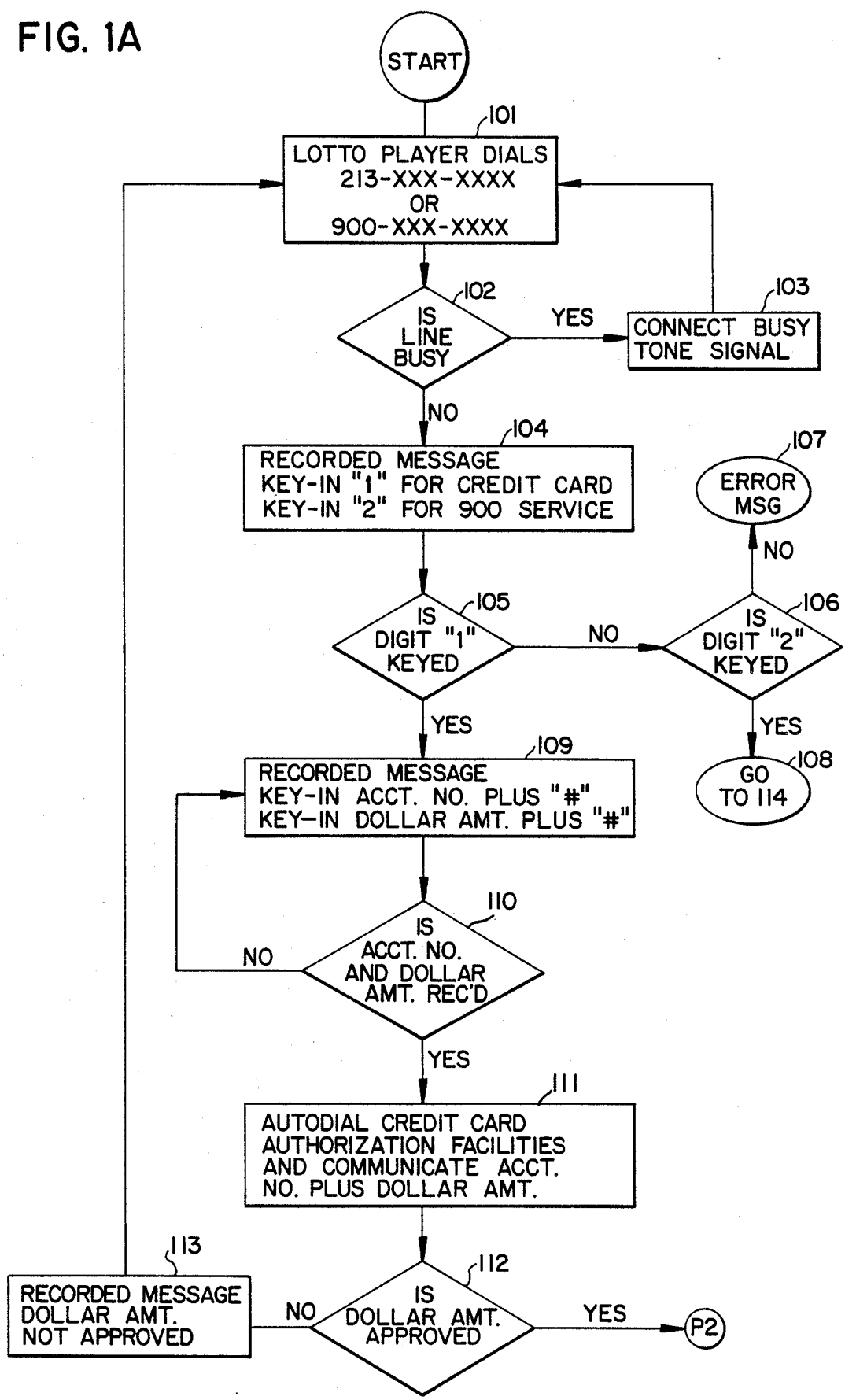

The process begins at step 101 with the lotto player dialing either of the dedicated (213) or (900) inward calling phone numbers to access and interact with the lotto computer at step 104 to purchase a lotto selection to play a lotto game.

A decision at step 102 determines whether the line of the phone number dialed is busy. If the line is busy, step 103 telephone company central office equipment, prior art, connects audible busy tones to the line of the lotto player. If the line is not busy, step 104 lotto computer facilities enables a recorded message which instructs the lotto player to indicate by keying-in on his/her touchtone phone a digit "1" for use of a credit card or a digit "2" for use of a 900 service to purchase the lotto selection.

Assuming that step 105 the digit "1" has, indeed, been keyed, step 109 lotto computer facilities enables the recorded message which instructs the lotto player to key-in on the touchtone phone the account number of the credit card plus the "#" code key, and then key-in the dollar amount to be charged to the account number plus the "#" code key. However, step 106 if the digit "2" is keyed, step 114 via step 108 lotto computer facilities enables the recorded message which instructs the lotto player to indicate by keying-in on the touchtone phone a digit "1" to automatic select the lotto selection or a digit "2" to manual select the lotto selection.

Referring now back to step 110, a decision is made to determine whether the keyed-in account number and dollar amount is received and accepted by the lotto computer facilities. If it is determined that the account number and/or the dollar amount is not acceptable, step 109 is repeated. If the account number and the dollar amount is accepted, step 111 lotto computer facilities autodials the dedicated phone number of a credit card authorization and processing facilities and electronically communicates the account number and the dollar amount for approval. At step 112 a decision is made to determine whether an approval or denial code number is received to the lotto computer facilities. If the denial code number is received, step 113 lotto computer facilities enables the recorded message which informs the lotto player that approval is denied. If the approval code number is received, step 114 lotto computer facilities enables the recorded message which instructs the lotto player to indicate by keying-in on the touchtone phone a digit "1" to automatic select the lotto selection or a digit "2" to manual select the lotto selection.

A decision at step 115 determines whether the lotto player keyed-in on the touchtone phone the digit "1" to automatic select the lotto selection. Assuming that the digit "1" has been keyed, step 116 lotto computer facilities random selects the lotto selection from a plurality of lotto numbers, e.g. retrieves "6" possible winning lotto numbers out of "37" lotto numbers which are stored in the lotto computer memory and then step 122 generates a confirmation number for verification of the lotto player's participation in the lotto game. The lotto computer facilities then vocally communicates the random selected lotto selection and the confirmation number to the lotto player via the touchtone phone.

A decision is made at step 117 to determine whether the lotto player keyed-in on the touchtone phone the digit "2" to manual select the lotto selection from the plurality of lotto numbers which are stored in the memory.

If the digit "2" was, indeed, keyed, step 119 lotto computer facilities enables the recorded message which instructs the lotto player to key-in on the touchtone phone a desired number of lotto numbers plus an "*" code key for each manual lotto selection to be purchased based on the dollar amount approved and conclude the manual lotto selection by keying-in on the touchtone phone a "#" code key. At step 120 lotto computer facilities responds to the keyed "#" code key by enabling a table look-up routine to match the keyed-in lotto numbers with the plurality of corresponding lotto numbers stored in the memory.

A decision at step 121 determines whether a match of the keyed-in lotto numbers with the lotto numbers stored in the memory has occurred. If a match did not occur, step 119 the recorded message is repeated to the lotto player. However, if a match has occurred, step 122 lotto computer facilities generates a confirmation number and vocally communicates the confirmation number and the keyed-in lotto numbers to the lotto player for his/her records.

Lotto computer facilities at step 123 stores to memory all data information keyed-in on the touchtone phone by the lotto player as well as data information generated by the lotto computer facilities. Verification of the lotto player's participation in the lotto game and financial activity reports are generated from the lotto computer's memory facilities and printed or displayed on a printing or displaying device.

Referring now back to FIG. 1a, step 106 the method for verifying and validating the lotto player's use of the 900 calling number step 108 and billing and collecting from the lotto player the dollar amount for the purchase of the lotto selection is the sole responsibility of the telephone company to which the lotto player's telephone line is connected. The telephone company bills and collects from the lotto player via the lotto player's office or residence monthly telephone statement a fixed dollar amount for the purchase of the lotto selection and a fixed line fee for using the 900 inward calling phone number. This arrangement is based on a signed contractual agreement between a long distance carrier, i.e. MCI, AT&T or US Sprint, and the service provider (owner/controller of the lotto computer).

Figure 2:
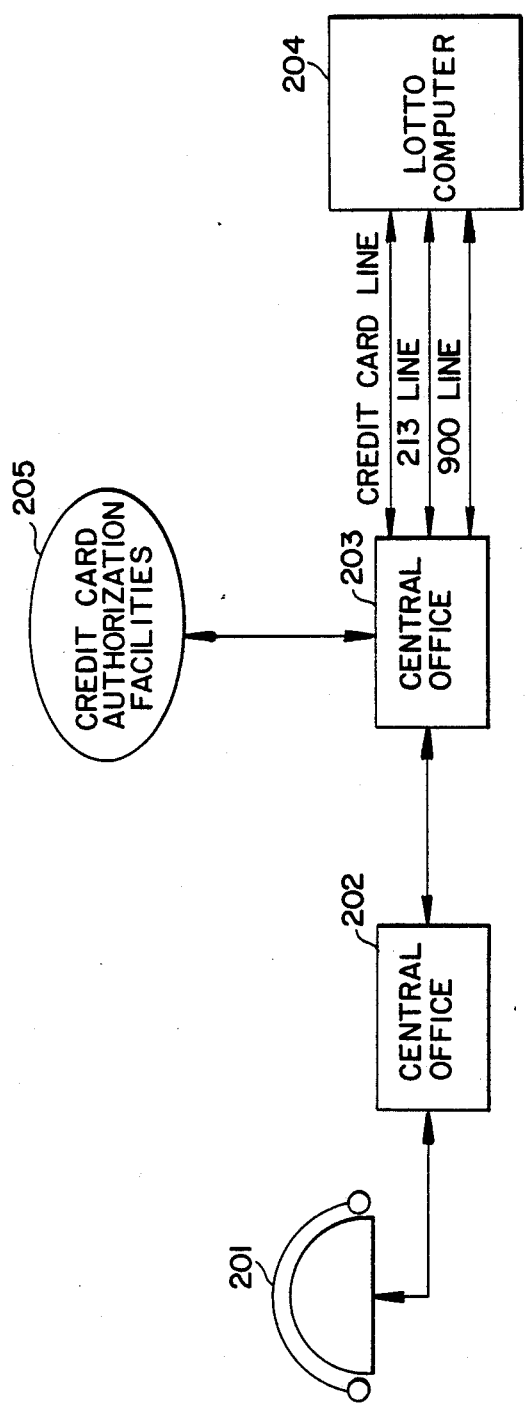
FIG. 2 is a simplified diagram of the principal components necessary to allow a lotto player to dial from a touchtone phone to access and interact with a lotto computer to play a lotto game.

Referring now to FIG. 2, is shown a simple block diagram of the preferred embodiment (s) of the principal components necessary to allow a lotto player to use the touchtone phone 201 which is connected via telephone lines to telephone company central office equipment 202 to dial the dedicated inward calling phone number (213) to access and interact with the lotto computer 204 to purchase and automatic or manual select a lotto selection, and charge the dollar amount for the purchase of the lotto selection to a credit card. The lotto computer 204 which is connected via a modem and telephone lines to telephone company central office equipment 203, upon the receipt of the credit card account number and the dollar amount keyed-in on the touchtone phone (201) by the lotto player, autodials the phone number (credit card line) for a credit card authorization and processing facilities 205 and electronically communicates the account number and dollar amount for approval. The credit card authorization and processing facilities 205 responds to the received account number and dollar amount by electronically communicating an approval or denial code number to the lotto computer 204.

If the touchtone phone 201 is used to dial a 900 inward calling phone number (900 line) to access and interact with the lotto computer 204 to purchase and automatic or manual select the lotto selection, permits the telephone company central office equipment 202 to bill and collect from the lotto player, via the lotto player's office or residence monthly telephone statement, a fixed dollar amount for the purchase of the lotto selection and a fixed telephone line fee for use of the 900 phone number.

What is claimed is:

1. A telephone system for playing a lotto game by a lotto player, said telephone system comprises a touchtone phone which is connected via telephone lines to a telephone company central office, wherein the touchtone phone allows said lotto player from an office, home, car, pay phone or any other location to dial an inward calling conventional 213-type phone number or an enhanced inward calling 900-type service to access and interact with said telephone system to purchase and automatically or manually select a lotto selection from a plurality of lotto numbers, said telephone system selectively charges the dollar amount for said purchase of said lotto selection to a credit card or a 900-type service, said telephone system comprising:

(a) lotto computer means;

(b) memory means for storing a plurality of lotto numbers which designate a range of possible numbers, e.g. 1 to 53, said memory means being attached to and used by the lotto computer means;

(c) multi-frequency receiver and decoder means for receiving and decoding data information input on said touchtone phone by said lotto player in response to said recorded operating instructions, and for receiving and decoding said data information from said credit card authorization and processing facilities;

(d) voice synthesizer means for vocally communicating said lotto selection and an associated confirmation number to said lotto player;

(e) means for providing said lotto player with said inward calling 213-type phone number and said 900-type service to dial to access the lotto computer;

(f) means for the player to access said lotto computer by dialing said 213-type phone number from said touchtone phone;

(g) means for the player to access said lotto computer by dialing said 900-type service from said touchtone phone;

(h) means for answering said lotto player's incoming call and for providing recorded vocal operating instructions to the lotto player, said operating instructions instruct the player to selectively input a predetermined first digit to indicate the use of said 900-type service or a predetermined second digit to indicate the use of said credit card to charge said dollar amount for the purchase of said lotto selection;

(i) first means for responding to said predetermined first digit input by instructing the player to input a game-type selection digit to chose the desired type of game between an automatic and manual type lotto selections;

(j) second means for responding to said predetermined second digit input by instructing the player to input a credit card account number and a dollar amount to be charged to said account number;

(k) means for receiving the account number and dollar amount and means for determining whether said account number and dollar amount conform to a predetermined format;

(l) means for instructing the player to re-input the account number and dollar amount if the determining means concludes the previously input account number and dollar amount do not conform to the format;

(m) means for automatically dialling a credit card authorization and processing facility and for communicating said account number and dollar amount to said credit card authorization and processing facility for card approval;

(n) means for receiving a predetermined code number from said facility approving or denying said dollar amount;

(o) means for responding to said code number approval of said dollar amount by enabling a recorded message which instructs the player to input the game-type selection digit to chose the desired type of game between the automatic and manual type lotto selections;

(p) means for responding to said code number denial of said dollar amount by enabling a recorded message which informs the player that the credit card has been denied;

(q) random number generating means for randomly selecting each lotto selection;

(r) means for actuating the lotto computer means for automatically and randomly selecting the lotto selection from said plurality of lotto numbers stored in the memory means in response to the game-type selection digit corresponding to the automatic lotto selection game;

(s) means for generating said confirmation number and for vocally communicating the confirmation number and lotto selection to the player and for storing the confirmation number and lotto selection in the memory means;

(t) means for enabling the recorded message to instruct the player to manually input a predetermined number of lotto numbers, in response to the game-type selection digit corresponding to the manual lotto selection game;

(u) means for comparing each lotto number input by the player to the plurality of lotto numbers stored in the memory means to determine if the players selection is within the possible range and for initiating said confirmation number generation means if the players selections are within the possible range;

(v) means for allowing said player to input the lotto numbers again if the comparison means determines the players lotto number does not match any of the plurality of lotto numbers within the possible range;

(w) means for permitting the telephone company central office to bill and collect from the player by a telephone monthly statement, said monthly statement comprising a flat billing fee for using said 900-type service and the dollar amount for the purchase of the lotto selection.

* * * * *